Patented Oct. 18, 1949

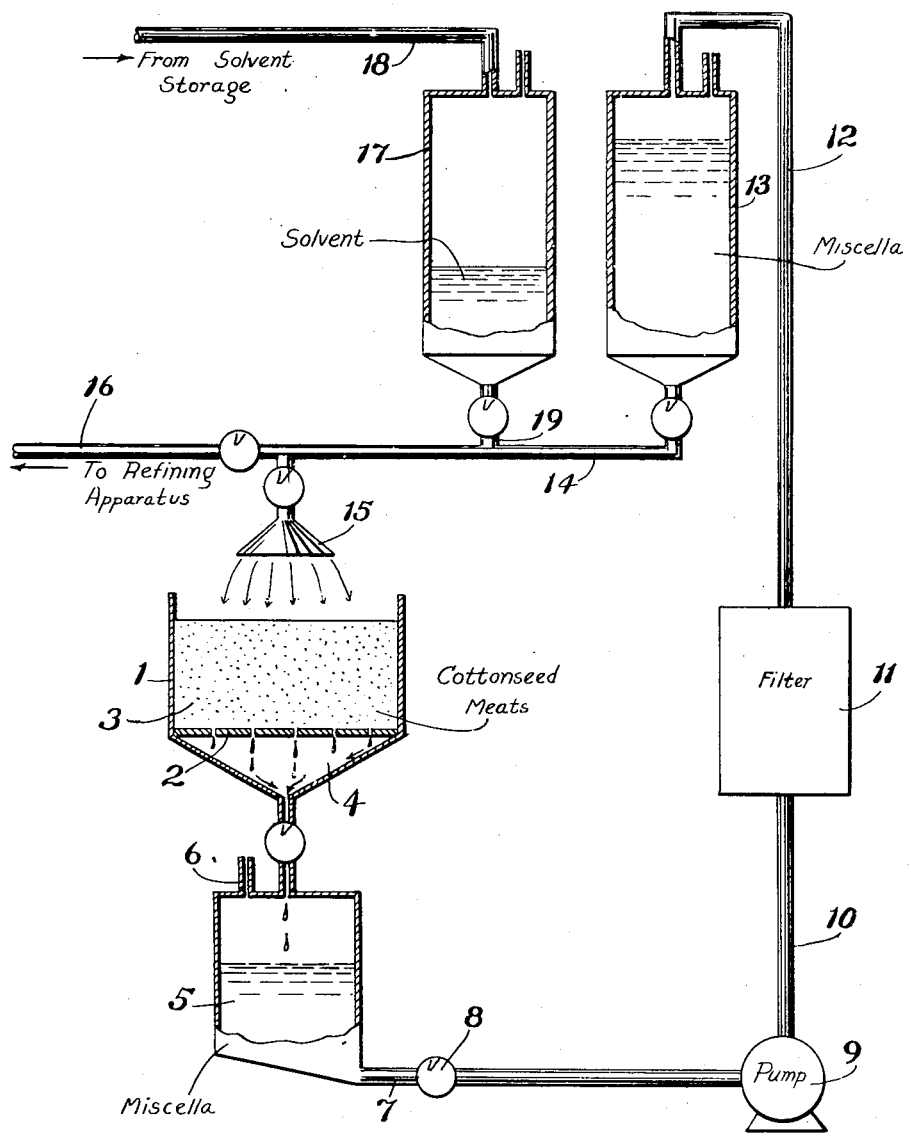

2,484,831

UNITED STATES PATENT OFFICE 2,484,831

PRODUCTION OF COTTONSEED MEAL

Ralph P. Hutchins, Piqua, and Walter H. Williamson, Indian Hill, Ohio, assignors to The Procter & Gamble Company, Ivorydale, Ohio, a corporation of Ohio Application May 11, 1948, Serial No. 26,454

4 Claims. (Cl. 99—2)

This invention relates to solvent extraction of cottonseed meats, and more particularly to the production of a solvent extracted, substantially non-toxic, highly nutritious cottonseed meal of bright yellow color suitable for general feeding purposes.

Examination of a cross-section of a cotton seed under a microscope will show that the white flesh is dotted with numerous dark spots which are customarily referred to as "resin cavities." The constituent of these resin cavities which is of chief interest in the consideration of the present invention is a substance called gossypol.

In the untreated cotton seeds, the gossypol exists in a toxic form designated as "free" gossypol. Under suitable conditions this free gossypol can be converted to a non-toxic gossypol complex, sometimes designated as "bound" gossypol, by the application of heat and moisture. For this and other reasons, cooking procedures have become a recognized practice in preparing cottonseed meats for hydraulic pressing or solvent extraction so that the residual meats (or meal resulting from the grinding thereof) may have value as a food for farm animals for example. Such cooking procedures have also been used to render uncooked solvent extracted cottonseed meats more suitable for feed purposes.

The amount of toxic gossypol that is converted to the non-toxic bound form in such cooking treatment is dependent on the actual cooking conditions, higher temperatures for example being accompanied by greater conversion. However, the cooking operation simultaneously effects a denaturing of the protein with resulting decrease in the nutritive value thereof, and suitable control of cooking must be exercised to strike a desirable balance in the content of toxic gossypol and undenatured protein.

It has been found that if the cooking procedure is carried to the point of substantially complete detoxification, the resulting meal is not only very low in nutritive value due to a high degree of denaturing of the protein but also is extremely dark and fails to meet the standards set by the National Cottonseed Products Association. Consequently cottonseed meals produced in accordance with commercial practices used heretofore contain appreciable quantities of toxic gossypol and therefore have limited use because they cannot be safely fed to animals such as horses and swine whose tolerance for toxic gossypol is very low.

Treatment of such cottonseed meals with gossypol solvents such as benzene, ethyl ether, acetone, chloroform, and the like has also been proposed as a means for reducing the toxic gossypol content and rendering the meals suitable for general feeding purposes, but to date such procedures have been commercially impractical, because of the expense necessarily involved in carrying out the additional extraction step.

Moreover, solvent extraction processes applicable to the meats directly and employing a solvent such as benzene, ethyl ether, etc., which dissolves both the oil and gossypol from the meats, have been proposed, but these practices also have been commercially uneconomical and impractical primarily because the extracted oil recovered is dark and cannot be refined and bleached to give an acceptable finished oil.

The primary objects of our invention are to provide a process for simultaneously extracting oil from cottonseed meats and rendering gossypol non-toxic without causing undue darkening of the oil or appreciable protein denaturing, and to produce a bright yellow cottonseed meal of superior quality as measured by present day standards.

In accordance with our invention, the cottonseed meats are contacted for an extended period with a solvent mixture comprising essentially methanol and an aliphatic hydrocarbon at temperatures below the point at which appreciable denaturing of the protein will take place. We have found that this treatment, as more fully hereinafter described, satisfactorily extracts the oil and has the unique effect of diffusing the gossypol of the resin cavities throughout the meats and of simultaneously converting the gossypol to a brightly colored insoluble non-toxic complex (bound gossypol) without appreciably reducing the nutritive value of the insoluble protein. As far as we are aware, our process produces a cottonseed meal in the combination of desirable features including nutritive value, low oil content, low toxic value, and bright yellow color. Therefore, the invention constitutes an important advance in the art.

The accompanying drawing shows diagrammatically an apparatus with which the process of our invention may be practiced in a circulatory manner to produce our new and useful product. The numeral 1 indicates a basket type container, known in the art, with a suitable perforated bottom 2 designed to retain the charge of cottonseed meats 3 during the extraction process without appreciably resisting the flow of solvent. The collecting chamber 4 beneath the perforated plate 2 is connected by means of a valved line to a receiving tank 5 provided with vent 6. An outlet pipe 7 containing valve 8 is connected to the inlet side of a suitable pump 9 employed for recirculating the miscella (solvent containing dissolved oil). Pump 9 is provided to force the miscella through discharge pipe 10, filter 11, and pipe 12 to miscella temporary storage tank 13. Valved pipe 14 is provided to conduct the miscella from tank 13 to distributing device 15 positioned over the charge of meats 3 in basket 1. Pipe 16 may be used at the end of extraction to conduct the miscella to refining apparatus not shown. Tank 17, fed by pipe 18 and connected by valved pipe 19 to pipe 14, is provided for supplying fresh solvent to the system at the end of the extraction.

In a preferred practice of our process the cotton seeds are first humidified or dried to a moisture content of about 13 per cent. The seeds are then hulled in the normal manner, and the recovered meats are heated to 100° to 150° F., preferably about 130° F., to condition them for flaking. The conditioned meats are then converted into flakes from about .005 to .008 inch in thickness by passage through the usual rolling equipment. The thus prepared meats containing about 10 per cent moisture are charged to basket 1 and extracted as described below with about five parts by weight of a single phase solvent mixture comprising essentially 7½ per cent by weight of methanol and 92½ per cent by weight of commercial hexane.

The solvent mixture in tank 13 at about 110° F. is distributed through device 15 over the meats 3 in basket 1 preferably at a rate such that the meats remain covered throughout the extraction process. As the solvent mixture drains through the meats, the oil is extracted and the necessary contact of the hexane-methanol mixture with the gossypol in the meats is established. The miscella drains into receiving tank 5 from which it is pumped by means of pump 9 to temporary storage tank 13 from which the miscella is drawn off and again distributed over the meats. Recirculation of the miscella is continued for about 60 minutes after which the extracted meats are flushed with fresh solvent mixture from tank 17.

The extracted meats are then removed from the basket 1 and passed through a conditioning apparatus (not shown in the drawing) wherein the residual solvent is evaporated and preferably stripped off with steam at a temperature not substantially higher than 220° F. Other conditioning equipment operated under vacuum may be substituted if desired.

The conditioned extracted meats are then cooled and formed into a meal by grinding to pass a 20-mesh screen. The miscella is refined in accordance with known procedures to produce a refined oil which is at least equal in quality to that obtained in the usual methods of cottonseed oil preparation.

An examination and analysis of meal produced by the above process will show that it contains about 50 per cent protein, that it is bright yellow in color, surpassing the National Cottonseed Products Association standard for prime 41% protein meal (Munsell Color Standard "1½ yellow 5/5"), that it contains not substantially more than one per cent oil, that its toxic gossypol content is less than 0.02 per cent, such as 0.001 to 0.005 per cent, as contrasted with a free gossypol content of about 0.03 to 0.1 per cent in present day commercial meals from hydraulic pressing, and that its content of non-toxic methanol-converted gossypol complex (bound gossypol) is from about 0.5 per cent to about 1.0 per cent, usually about 0.8 per cent. The brilliance of the yellow color decreases with decrease in content of non-toxic gossypol complex and the preferred meal products of our invention do not contain substantially less than 0.5 per cent of this constituent.

The following procedure was employed to determine the free gossypol content of cottonseed meals.

Ten grams of meal finely pulverized and of normal moisture content (5 to 15%), 50 ml. of redistilled chloroform (measured with a pipette or burette) and two ⅜ inch bright steel balls are charged to a 125 ml. Erlenmeyer flask. Stoppers are secured in place and the flasks are mounted on a disk 15 inches in diameter and inclined 60° to the horizontal, and adapted to rotate at about 57 revolutions per minute. Agitation of the contents of the flasks is effected over a period of 24 hours by rotation of the disk. At the end of this period the contents of each flask are poured on a folded Whatman 40 filter paper supported in a funnel. The funnel is covered with a watch glass and the filtrate is received in a flask which is closed with a glass stopper as soon as the filtration is completed. Every precaution is taken to avoid loss of the chloroform solvent by evaporation. (When the amount of gossypol is relatively high, that is more than 0.02%, the amount of the meal sample may be decreased to 5 grams.)

From 1 to 10 ml. of the filtrate, depending on the gossypol content of the sample, is then transferred to each of two 50 ml. volumetric flasks. One flask is filled to the mark with n-butanol. To the other flask is added 2 ml. of freshly distilled aniline and enough n-butanol to fill the flask to the mark. Both flasks are mixed thoroughly. After 20 minutes standing (to develop the color produced by dianiline gossypol formation), a sample of each solution is transferred to separate glass absorption cells of 2 cm. depth and these are read in a Klett-Summerson colorimeter provided with a number 44 filter. The colorimeter should be turned on 10 minutes before using. The scale reading of the solvent mixture containing no aniline, that is the blank, is set at zero. The scale reading of the dianiline gossypol sample should read in the range of 200–350 for best results. However, when the amount of gossypol is very low, lower readings are permissible.

From these data the per cent gossypol is calculated as follows for a Klett-Summerson reading on 2 cm. cells:

$$\text{Per cent free gossypol} = \frac{0.1 \times B}{S}$$

Where $$D = \frac{\text{Scale reading}}{1000}$$

S = Weight of sample in gms. represented by the aliquot placed in the 50 ml. volumetric flask.

0.1 = A factor determined experimentally on dilutions of pure gossypol.

The content of bound gossypol is determined by subtracting the result of the free gossypol analysis from the total gossypol content which is determined as follows.

A 25 gram sample of the meal is suspended in about 65 ml. of redistilled aniline and the mixture is heated to 110°–115° C. for 10 minutes. The mass is allowed to cool to about 100° C. and is then filtered through a Buchner funnel with the aid of suction. The residue on the filter is washed thoroughly with ethyl ether. The filtrates are combined, then concentrated to 25 c. c. by evaporation on the steam bath under a current of air.

The residual aniline solution is then transferred as completely as possible to a 250 c. c. Erlenmeyer flask, 75 c. c. of methanol being employed to wash the remaining traces of aniline solution from the container. After thoroughly mixing the methanol with the aniline solution, the flask and contents are transferred to a refrigerator and crystallization of the dianiline-gossypol is allowed to take place for about 10 days at about 45°–50° F. Occasional scraping of the inside of the flask with a stirring rod under the surface of the liquid is desirable to promote crystallization.

The dianiline-gossypol precipitate is filtered, washed with cold petroleum ether, then dried at about 105° C. for about 2 hours, and finally weighed. Total gossypol is calculated according to the following formula:

$$\text{Percent total gossypol} = \frac{\text{Weight of ppt.} \times 0.76 \times 100}{\text{Weight of sample}}$$

The factor 0.76 represents the grams of gossypol per gram of dianiline-gossypol.

The higher nutritive value and greater edibility of products produced in accordance with our process as illustrated above have been demonstrated by controlled feeding tests in which the results show (1) that during the period of rapid growth the body weight gains of young rats receiving cottonseed meal of the present invention as the source of protein in the nutrition of the animal were about 20 per cent greater compared to body weight gains of similar animals receiving prime commercial cottonseed meal containing about 44% protein by analysis and produced by hydraulic pressure of cooked meats (the feedings being equalized and the level of protein intake being the same in all cases), and (2) that in contrast with such present day prime cottonseed meals (which contain more than 0.03 per cent toxic gossypol) those meals produced by our process may be safely fed at appreciably higher ration levels to animals such as swine, whose tolerance towards toxic gossypol is very low.

The results of additional feeding tests on rats have shown that the lower nutritional value of prime cottonseed meal resulting from hydraulic pressing is apparently due to its lower content of special amino acids, such as lysine and methionine, which are so modified by the cooking process as to be rendered non-available to the animal and on which the relative values of proteins in nutrition are based. Specifically it has been shown that supplementing the commercial hydraulic meal protein with lysine or methionine enhanced the growth of young rats and increased the growth efficiency of the ration, whereas supplementing the protein of the meal of the present invention with the same amino acids under comparable conditions effected no appreciable improvement in growth or efficiency of the ration. It is to be concluded, therefore, that the practice of the present invention is materially less destructive with respect to the amino acid content of the protein in the cotton seed.

In regard to nutritive value of meals, it appears desirable to point out that the protein content of cottonseed, and therefore of the cottonseed meal recovered, varies with the growing season and with the efficiency of hull removal in processing. Consequently commercial cottonseed meals are standardized in accordance with rules set by the National Cottonseed Products Association and, with regard to protein content, are designated as 36%, 41%, or 43% protein meals, adjustment to such levels sometimes being made at the mill by the addition of hull bran (usually dark in color) or other means, provided of course the meals are not rendered darker in color than the Munsell Color Standards "10 yellow-red 5/5" for a 36% protein prime meal, or "1½ yellow 5/5" for a 41% or higher prime protein meal. However, in designating a meal as a prime 41% protein meal no distinction is made between denatured protein, which is very low in nutritive value as above shown, and protein which has not been denatured and which has all of its original food value. Thus, although a 41% protein meal may meet with all standards set therefor, the basic nutritive value may vary widely depending on how much of the original protein has been denatured in processing. Meals produced by the process of the present invention, wherein the amount of denaturing is very low, are markedly more nutritious and are therefore of more value as food than those meals produced by existing practices wherein material denaturing is inherently a part of the processing step which effects detoxification.

As in the case of hydraulic meals, the protein content of the meals of the present invention may be adjusted by the addition of hull bran or other means, and since the original meal is bright yellow in color, such adjustment may be readily made without rendering the meal darker than the prescribed color standards.

Whether or not the meals of our process are modified by such adjustment measures, they may be distinguished over prior art products by their low content of free or toxic gossypol, their relatively high content of converted or non-toxic (bound) gossypol and their higher content of available amino acids essential for animal growth.

Instead of employing the circulating method for extraction, described above, it is possible to accomplish the objects of our invention merely by contacting the solvent mixture with the meats in a suitable container for a sufficient period of time to extract the oil and convert the gossypol to the non-toxic form, following which the oil-solvent solution may be drawn off and the residue flushed with fresh solvent or hexane to remove residual oil.

Other methods of conducting the process will be obvious to those versed in the art, and it is within the scope of the present invention to conduct the process by any known continuous or semi-continuous con- or countercurrent extraction processes, provided the solvent is maintained in contact with the meats sufficiently long to effect sufficient conversion of toxic gossypol to the non-toxic complex form.

The single phase methanol-aliphatic-hydrocarbon solvent mixture employed in the practice of our invention appears to be unique in accomplishing the conversion of toxic gossypol to non-toxic highly colored gossypol complex and the diffusion of same throughout the meats without dissolving appreciable quantities from the meats and without appreciably reducing the nutritive value of the protein. The substitution of either ethanol or isopropanol for methanol in the solvent mixture fails to give a bright yellow, substantially non-toxic, highly nutritious meal containing a high proportion of non-toxic gossypol such as is obtained with the use of methanol. For example, controlled feeding tests have shown that the body weight gains of rats fed meal of the present invention, analyzing about 50% protein, were greater than those observed in the case of those rats which were fed meal (about 50% protein) resulting from either hexane-ethanol or hexane-isopropanol extractions. In fact those animals which were fed the meal of the hexane-isopropanol extraction steadily lost weight and died before the test was completed.

Moreover, the type of gossypol complex formed by use of alcohols other than methanol appears to be different. This can be demonstrated by treating meals, resulting from extractions with single phase solvent mixtures containing commercial hexane as the hydrocarbon and ethanol, isopropanol and methanol respectively as the alcohol, with a gossypol solvent such as chloroform, acetone, or ethyl ether. It will be observed that such gossypol complexes as may be formed in the use of solvent mixtures containing ethanol or isopropanol are appreciably soluble and that the content of same in the meal is reduced by this treatment whereas there is no such reduction in the case of the methanol-converted gossypol complex.

Furthermore, the highly colored gossypol complex formed in the practice of our invention, in contrast to the complexes formed by ethanol or isopropanol also appears to be substantially insoluble in the hexane-alcohol solvent mixture, and as a result the meals produced possess desirable color. Whereas the meal resulting from the extraction with the solvent containing methanol is bright yellow in color, those resulting from extractions with mixtures containing ethanol or isopropanol possess only a slight yellow tinge and are, in fact, grayish and unpleasing to the trade.

In connection with the effect of the solvent mixture on the glossypol, it should be pointed out also that solvent mixtures containing either ethanol or isopropanol in place of methanol in combination with the aliphatic hydrocarbon appears to be less efficient in converting free (toxic) gossypol to the complex (non-toxic) form, and meals resulting from such extractions have been found to contain more than 0.05 per cent toxic gossypol, considerably more than is permissible in a meal which is to be fed at high ration levels to animals of low gossypol tolerance.

As above pointed out, sufficient time of contact between the solvent mixture and the meats should be allowed not only to dissolve the oil from the meats efficiently but also to effect adequate conversion of toxic gossypol to the non-toxic gossypol complex. This time will vary depending in part on the temperature and the proportion of methanol in the solvent mixture, an increase in either variable making possible a reduction in the necessary contact time. The time will also vary depending on the particle size of the meats being extracted, particles of larger size requiring a longer time of contact. For example, in extracing cottonseed meats flaked to about 0.005 inch thickness with the use of five parts of a solvent mixture containing 7½ per cent by weight of methanol and the balance commercial hexane at a temperature of 110° to 120° F. (just below the boiling point of solvent mixture), the time of contact should be not substantially less than 30 minutes in order to reduce the toxic gossypol content below 0.03 per cent. Under preferred conditions of operation involving contact periods from about 45 to 60 minutes the toxic gossypol content is reduced to the range of 0.001 per cent to about 0.02 per cent, which, of course, is sufficiently low to render the meal substantially non-toxic for general animal feeding purposes.

The amount of methanol used in the solvent mixture in the practice of our invention is not critical. However, the amount should be sufficient to effect conversion of substantially all toxic gossypol to the non-toxic complex form. Too high a concentration of methanol will of course result in a less efficient extraction of oil from the meats. We prefer to employ a solvent mixture constituted of about 75 per cent to 98 per cent by weight of the aliphatic hydrocarbon and from about 25 per cent to about 2 per cent by weight of methanol.

The amount of aliphatic hydrocarbon in the solvent mixture is not critical, and the alcohol usage governs its proportion.

Moisture-free methanol is soluble in aliphatic hydrocarbons in all proportions at room temperature or higher. However, the presence of moisture in the alcohol decreases its solubility appreciably, and as little as 0.4 per cent water has been found to interfere with complete solution of the methanol in commercial hexane at temperatures below 100° F. An increase in temperature will, of ourse, increase the tolerance for moisture in the alcohol, but in no case should the moisture content of the methanol be above 0.8 per cent, otherwise the solvent mixture will separate into an aqueous alcohol phase and a hexane phase. The presence of an amount of moisture which will cause such separation will also effect extraction from the meats of substances such as sugars and other carbohydrates which are soluble in the aqueous alcohol phase and which have nutritive value.

Moreover a separated alcohol phase appears to have a greater solubility for the gossypol complex formed during extraction than does the single phase alcohol-hydrocarbon solvent mixture, and thereby reduces the gossypol complex content to a value below the minimum value desirable for imparting the yellow color to the meal.

Water also renders cottonseed meats gelatinous, and in such form, a bed of same will offer considerable resistance to the flow of the solvent mixture therethrough. In a continuous extraction process, for example, wherein the solvent percolates successively through the meats contained in a series of baskets, the presence of a separated aqueous alcohol phase introduces considerable difficulty and cannot be tolerated in commercial practice.

Too much moisture in the meats interferes seriously with efficient extraction of the oil therefrom and may also introduce difficulties due to the solution of the moisture by the alcohol and the resulting separation of the alcohol from the hydrocarbon. Of course, as in other solvent extraction methods, some moisture in the meats is advantageous during the conditioning step which precedes flaking and extraction, so that meats delivered to the extraction step should contain a minimum of about 7 per cent and a maximum of about 13 per cent moisture, and preferably around 9 to 11 per cent for optimum results.

It has been observed also that the rate of solution of the methanol in commercial hexane is low at temperatures appreciably below 100° F., and accordingly mixing is preferably conducted above this temperature.

In order to minimize the possibility of separation of alcohol from the solvent mixture, the temperature of extraction is preferably controlled above 100° F. It should be borne in mind, however, that an increase in temperature is accompanied by an increase in the proportion of protein that is denatured and accordingly temperatures up to the boiling point of the solvent but not substantially above 150° F. are preferable. For simplicity and safety of operation, minimum protein denaturing, maximum economy, and maximum efficiency in drainage of solvent from the meats, we have found that the use of temperatures in the range of 100 to 115° F. are preferable when a solvent mixture constituted of 92½ per cent commercial hexane and 7½ per cent methanol (boiling point—125° F.) is employed.

The ratio of solvent to cottonseed meats does not appear critical insofar as achieving the advantages of the present invention are concerned. However, for economical operation it is important to reduce the residual oil in the meats to a minimum, and to this end we have found that it is preferable to employ an amount by weight of the mixed solvent which is at least 1.8 times the weight of the meats when continuous counter-current extraction is being used or at least five times the weight of the meats when batch extraction procedures are employed.

Various aliphatic hydrocarbon solvents boiling in the range of 86° to 220° F. at atmospheric pressure, such as pentane, hexane, cyclohexane, heptane and their commercial mixtures which may include 2-methyl pentane, 2,3-dimethyl pentane, 2,2-dimethyl pentane, 2-methyl butane, 2,3-dimethyl butane, 2,2-dimethyl butane and unsaturated aliphatic hydrocarbons such as hexene, heptene and those resulting from the polymerization of olefines which are derived in petroleum cracking operations, such as the di-isobutylenes, 2,4,4-trimethyl pentene-1, and 2,4,4-trimethyl pentene-2 as well as hydrogenation products thereof which are sufficiently volatile as hereinafter described may be used. Aromatic hydrocarbons such as benzene are not suitable.

In the use of those aliphatic hydrocarbons boiling at lower temperatures such as commercial butane which boils over the range 18° to 32° F., one is limited in the maximum temperature which can be employed in extracting unless the system is maintained under positive pressure to maintain the solvent in the liquid phase at the temperature desired for extraction. At lower temperatures of extraction increased contact times are preferably employed to extract the oil efficiently and to reduce the toxic gossypol content below 0.02 per cent.

Although a preference for the higher boiling permissible aliphatic hydrocarbon solvents is thus indicated, we wish to point out that it is preferable to avoid the use of those aliphatic hydrocarbons which are difficultly volatilizable at temperatures in excess of 220° F. at atmospheric pressure or below because of the denaturing of the protein and the consequent reduction in nutritive value that may take place in removing the last traces of solvent from the meal. Obviously, it is also advisable to reduce the time of treatment at such temperatures to a minimum. Such dangers of denaturing the protein are minimized by the employment of equipment which can be operated under vacuum in the solvent stripping operation, especially when the higher boiling aliphatic hydrocarbons are employed. We prefer to use a commercial hexane such as Skellysolve B having a boiling point range of 146° to 156° F. in the practice of the invention.

This application is a continuation-in-part of application Serial No. 656,047, filed March 21, 1946, now abandoned.

Having thus described our invention, what we claim and desire to secure by Letters Patent is:

1. The process of solvent extracting oil from cottonseed meats and of producing a substantially non-toxic, nutritious meal of bright yellow color comprising subjecting cottonseed meats containing less than 13 per cent moisture to the action of a single phase liquid solvent mixture essentially comprising methanol and an aliphatic hydrocarbon which is substantially completely volatilizable at a temperature below 220° F., and maintaining contact of meats with solvent until the free gossypol content of the meats is below 0.02 per cent, and thereafter separating solvent from the extracted meats at a temperature not substantially in excess of 220° F.

2. The process of solvent extracting oil from cottonseed meats and of producing a substantially non-toxic, nutritious meal of bright yellow color which comprises contacting cottonseed meats containing not substantially more than 13 per cent moisture with a single phase liquid solvent mixture comprising essentially (1) an aliphatic hydrocarbon which is substantially completely volatilizable at temperatures below 220° F. and (2) less than 25 per cent but not less than 2 per cent by weight of methanol based on the solvent mixture, and maintaining said contact for a period of time not substantially less than 30 minutes.

3. The process of solvent extracting oil from cottonseed meats and of producing a substantially non-toxic, nutritious meal of bright yellow color, which comprises contacting at a temperature from about 100° F. to 150° F. cottonseed meats containing not substantially more than 13 per cent moisture with a single phase liquid solvent mixture comprising essentially from 75 per cent to 98 per cent aliphatic hydrocarbon substantially completely volatilizable at temperatures below 220° F., and 25 per cent to 2 per cent methanol, the said methanol containing not more than 0.8 per cent moisture, and maintaining said contact for a period of time not substantially less than 30 minutes.

4. The process of solvent extracting oil from cottonseed meats and of producing a substantially non-toxic, nutritious meal of bright yellow color, which comprises contacting at a temperature from about 100° F. to 150° F. cottonseed meats containing not substantially more than 13 per cent moisture with a single phase liquid solvent mixture comprising essentially 75 per cent to 98 per cent commercial hexane and 25 per cent to 2 per cent methanol containing not more than 0.8 per cent moisture, maintaining the contact for a period of time from about 45 to 60 minutes, flushing the residue of the extraction with fresh solvent, removing residual solvent from the residue of the extraction at a temperature not substantially in excess of 220° F. and grinding the residue to a meal.

RALPH P. HUTCHINS.
WALTER H. WILLIAMSON.

REFERENCES CITED

The following references are of record in the file of this patent:

UNITED STATES PATENTS

| Number | Name | Date |
|---|---|---|
| 2,297,503 | Rudolph | Sept. 29, 1942 |
| 2,316,503 | Olcott | Apr. 6, 1943 |

Certificate of Correction

October 18, 1949

Patent No. 2,484,831

RALPH P. HUTCHINS ET AL.

It is hereby certified that error appears in the printed specification of the above numbered patent requiring correction as follows:

Column 4, line 55, for that portion of the formula reading "$0.1 \times B$" read $0.1 \times D$; and that the said Letters Patent should be read with this correction therein that the same may conform to the record of the case in the Patent Office.

Signed and sealed this 2nd day of May, A. D. 1950.

[SEAL]

THOMAS F. MURPHY,
*Assistant Commissioner of Patents.*